(12) United States Patent
Healey et al.

(10) Patent No.: US 7,656,535 B2
(45) Date of Patent: Feb. 2, 2010

(54) OPTICAL SYSTEM AND METHOD FOR INFERRING A DISTURBANCE

(75) Inventors: Peter Healey, Ipswich (GB); Edmund S R Sikora, Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 11/791,923

(22) PCT Filed: Dec. 16, 2005

(86) PCT No.: PCT/GB2005/004873

§ 371 (c)(1),
(2), (4) Date: May 31, 2007

(87) PCT Pub. No.: WO2006/064258

PCT Pub. Date: Jun. 22, 2006

(65) Prior Publication Data

US 2008/0018908 A1 Jan. 24, 2008

(30) Foreign Application Priority Data

Dec. 17, 2004 (GB) ................................. 0427733.1

(51) Int. Cl.
*G01B 9/02* (2006.01)
(52) U.S. Cl. ..................................................... 356/477
(58) Field of Classification Search ................. 356/477, 356/483, 35.5

See application file for complete search history.

(56) References Cited

U.S. PATENT DOCUMENTS

| 4,297,887 A | 11/1981 | Bucaro |
| 4,397,551 A | 8/1983 | Bage et al. |
| 4,443,700 A | 4/1984 | Macedo et al. |
| 4,463,451 A | 7/1984 | Warmack et al. |

(Continued)

FOREIGN PATENT DOCUMENTS

EP 0 251 632 A2 1/1988

(Continued)

OTHER PUBLICATIONS

International Search Report dated Mar. 15, 2006.

(Continued)

*Primary Examiner*—Hwa (Andrew) S Lee
(74) *Attorney, Agent, or Firm*—Nixon & Vanderhye P.C.

(57) ABSTRACT

The present invention relates to an disturbance sensing system, in particular an optical system in which a disturbance can be inferred. The system includes: a first waveguide portion and a second waveguide portion disposed in a side to side arrangement relative to one another; launch means for launching a first signal and a second signal onto the first waveguide portion and the second waveguide portion respectively, the first and second waveguide portions being optically coupled such that each of the transmitted first and second signals travels along each of the first and second waveguides; and, combining means for combining the transmitted first and second signals so as to produce a combination signal, the first and second signals being related to one another such that a disturbance in either one of the first and the second waveguide portions can be inferred from the combination signal. The noise or other signal resulting from a disturbance applied to both waveguide portions will be at least partially suppressed.

18 Claims, 2 Drawing Sheets

U.S. PATENT DOCUMENTS

| | | | |
|---|---|---|---|
| 4,538,103 A | 8/1985 | Cappon |
| 4,572,949 A | 2/1986 | Bowers et al. |
| 4,593,385 A | 6/1986 | Chamuel |
| 4,649,529 A | 3/1987 | Avicola |
| 4,654,520 A | 3/1987 | Griffiths |
| 4,668,191 A | 5/1987 | Plischka |
| 4,688,200 A | 8/1987 | Poorman et al. |
| 4,697,926 A | 10/1987 | Youngquist et al. |
| 4,708,471 A | 11/1987 | Beckmann et al. |
| 4,708,480 A | 11/1987 | Sasayama et al. |
| 4,770,535 A | 9/1988 | Kim et al. |
| 4,781,056 A | 11/1988 | Noel et al. |
| 4,805,160 A | 2/1989 | Ishii et al. |
| 4,847,596 A | 7/1989 | Jacobson et al. |
| 4,907,856 A | 3/1990 | Hickernell |
| 4,976,507 A | 12/1990 | Udd |
| 4,991,923 A | 2/1991 | Kino et al. |
| 4,994,668 A | 2/1991 | Lagakos et al. |
| 4,994,886 A | 2/1991 | Nadd |
| 5,004,912 A | 4/1991 | Martens et al. |
| 5,015,842 A | 5/1991 | Fradenburgh et al. |
| 5,046,848 A | 9/1991 | Udd |
| 5,051,965 A | 9/1991 | Poorman |
| 5,093,568 A | 3/1992 | Maycock |
| 5,104,391 A | 4/1992 | Ingle et al. |
| 5,140,559 A | 8/1992 | Fisher |
| 5,173,743 A | 12/1992 | Kim |
| 5,187,362 A | 2/1993 | Keeble |
| 5,191,614 A | 3/1993 | Lecong |
| 5,194,847 A | 3/1993 | Taylor et al. |
| 5,206,924 A | 4/1993 | Kersey |
| 5,223,967 A | 6/1993 | Udd |
| 5,311,592 A | 5/1994 | Udd |
| 5,313,266 A | 5/1994 | Keolian et al. |
| 5,319,609 A | 6/1994 | Regnault |
| 5,351,318 A | 9/1994 | Howell et al. |
| 5,355,208 A | 10/1994 | Crawford et al. |
| 5,361,130 A | 11/1994 | Kersey et al. |
| 5,363,463 A | 11/1994 | Kleinerman |
| 5,373,487 A | 12/1994 | Crawford et al. |
| 5,379,357 A | 1/1995 | Sentsui et al. |
| 5,412,464 A | 5/1995 | Thomas et al. |
| 5,457,998 A | 10/1995 | Fujisaki et al. |
| 5,473,459 A | 12/1995 | Davis |
| 5,491,573 A | 2/1996 | Shipley |
| 5,497,233 A | 3/1996 | Meyer |
| 5,500,733 A | 3/1996 | Boisrobert et al. |
| 5,502,782 A | 3/1996 | Smith |
| 5,604,318 A | 2/1997 | Fasshauer |
| 5,636,021 A | 6/1997 | Udd |
| 5,637,865 A | 6/1997 | Bullat et al. |
| 5,663,927 A | 9/1997 | Olsen et al. |
| 5,691,957 A | 11/1997 | Spiesberger |
| 5,694,114 A | 12/1997 | Udd |
| 5,754,293 A | 5/1998 | Farhadiroushan |
| 5,767,950 A | 6/1998 | Hawver et al. |
| 5,778,114 A | 7/1998 | Eslambolchi et al. |
| 5,936,719 A | 8/1999 | Johnson et al. |
| 5,975,697 A | 11/1999 | Podoleanu |
| 5,991,479 A | 11/1999 | Kleinerman |
| 6,072,921 A | 6/2000 | Frederick et al. |
| 6,075,628 A | 6/2000 | Fisher et al. |
| 6,115,520 A | 9/2000 | Laskowski et al. |
| 6,194,706 B1 | 2/2001 | Ressl |
| 6,195,162 B1 | 2/2001 | Varnham et al. |
| 6,269,198 B1 | 7/2001 | Hodgson et al. |
| 6,269,204 B1 | 7/2001 | Ishikawa |
| 6,285,806 B1 | 9/2001 | Kersey et al. |
| 6,315,463 B1 | 11/2001 | Kropp |
| 6,459,486 B1 | 10/2002 | Udd et al. |
| 6,594,055 B2 | 7/2003 | Snawerdt |
| 6,625,083 B2 | 9/2003 | Vandenbroucke |
| 6,628,570 B2 | 9/2003 | Ruffa |
| 6,788,417 B1 * | 9/2004 | Zumberge et al. ........... 356/477 |
| 6,859,419 B1 | 2/2005 | Blackmon et al. |
| 2001/0028766 A1 | 10/2001 | Hatami-Hanza |
| 2002/0196447 A1 | 12/2002 | Nakamura et al. |
| 2003/0103211 A1 | 6/2003 | Lange et al. |
| 2003/0117893 A1 | 6/2003 | Bary |
| 2003/0174924 A1 | 9/2003 | Tennyson |
| 2004/0027560 A1 | 2/2004 | Fredin et al. |
| 2004/0113056 A1 | 6/2004 | Everall et al. |
| 2004/0201476 A1 | 10/2004 | Howard |
| 2006/0256344 A1 | 11/2006 | Sikora |
| 2007/0009600 A1 | 1/2007 | Edgren et al. |
| 2007/0065150 A1 | 3/2007 | Sikora et al. |
| 2007/0264012 A1 | 11/2007 | Healey et al. |
| 2008/0013161 A1 | 1/2008 | Tokura et al. |
| 2008/0123085 A1 | 5/2008 | Sikora et al. |
| 2008/0166120 A1 | 7/2008 | Heatley et al. |
| 2008/0219093 A1 | 9/2008 | Heatley et al. |
| 2008/0219660 A1 | 9/2008 | Healey et al. |
| 2008/0278711 A1 | 11/2008 | Sikora et al. |
| 2009/0014634 A1 | 1/2009 | Sikora et al. |
| 2009/0097844 A1 | 4/2009 | Healey |
| 2009/0103928 A1 | 4/2009 | Healey et al. |
| 2009/0135428 A1 | 5/2009 | Healey |

FOREIGN PATENT DOCUMENTS

| | | |
|---|---|---|
| EP | 0 360 449 A2 | 3/1990 |
| EP | 0364093 | 4/1990 |
| EP | 0 376 449 A1 | 7/1990 |
| EP | 0 377 549 | 7/1990 |
| EP | 0376449 | 7/1990 |
| EP | 0513381 | 11/1992 |
| EP | 0 592 690 A1 | 4/1994 |
| EP | 0 794 414 A2 | 9/1997 |
| EP | 0 821 224 A2 | 1/1998 |
| EP | 0 953 830 A2 | 11/1999 |
| EP | 1 037 410 A2 | 9/2000 |
| EP | 1 096 273 A2 | 5/2001 |
| EP | 1236985 | 9/2002 |
| EP | 1 385 022 A1 | 1/2004 |
| EP | 1 496 723 A1 | 1/2005 |
| FR | 2 751 746 | 1/1998 |
| GB | 2 015 844 A | 9/1979 |
| GB | 2 019 561 A | 10/1979 |
| GB | 2 113 417 A | 8/1983 |
| GB | 2 126 820 A | 3/1984 |
| GB | 2 205 174 A | 11/1988 |
| GB | 2 219 166 A | 11/1989 |
| GB | 2 262 803 A | 6/1993 |
| GB | 2 264 018 A | 8/1993 |
| GB | 2 401 738 A | 11/2004 |
| JP | 2001-194109 | 7/2001 |
| WO | WO 93/25866 A1 | 12/1993 |
| WO | 97/05713 A1 | 2/1997 |
| WO | WO 97/05713 A1 | 2/1997 |
| WO | WO 01/67806 A1 | 9/2001 |
| WO | WO 02/065425 A1 | 8/2002 |
| WO | WO 03/014674 A | 2/2003 |
| WO | WO 03/014674 A2 | 2/2003 |
| WO | WO 2005/008443 A2 | 1/2005 |

OTHER PUBLICATIONS

U.S. Appl. No. 11/791,927, filed May 31, 2007, Sikora et al. (US 2008-0123085 A1).

U.S. Appl. No. 11/663,954, filed Mar. 28, 2007, Sikora et al. (US 2008-0278711 A1).

U.S. Appl. No. 11/663,957, filed Mar. 28, 2007, Healey et al.

U.S. Appl. No. 11/885,275, filed Aug. 29, 2007, Heatley et al. (US 2008-0166120 A1).

U.S. Appl. No. 11/885,400, filed Aug. 30, 2007, Heatley et al. (US 2008-0219093 A1).
U.K. Search Report dated May 24, 2005 in GB0506591.7.
International Search Report dated May 16, 2006 in PCT/GB2005/004850.
Office Action issued in U.S. Appl. No. 11/791,927, dated Jul. 8, 2009.
Office Action issued in U.S. Appl. No. 11/885,400, dated Jan. 14, 2009.
Office Action issued in U.S. Appl. No. 11/885,400, dated Jul. 7, 2009.
Office Action issued in U.S. Appl. No. 11/885,275, dated Mar. 25, 2009.
International Search Report mailed May 29, 2006 in PCT/GB2006/000759.
International Search Report dated Mar. 15, 2006 in PCT/GB2005/004873.
Yilmaz M. et al., Broadband vibrating quartz pressure sensors for tsunameter and other oceanographic applications, Oceans '04, MTTS/IEEE Techno-Ocean '04, Kobe, Japan, Nov. 9-12, 2004, Piscataway, NJ, USA, IEEE, Nov. 9, 2004, pp. 1381-1387, XP010776555; Internet version, Oceans 2004, Kobe, Japan, pp. 1-7, Redmond, WA US.
Liang et al., "Modified White-Light Mach Zehnder Interferometer for Direct Group-Delay Measurements," Applied Optics, vol. 37, Issue 19, Abstract, Jul. 1998.
Jang et al., "Noncontact Detection of Ultrasonic Waves Using Fiber Optic Sagnac Interferometer," IEEE Transactions on Ultrasonics, Ferroelectrics, and Frequency Control, vol. 49, No. 6, Jun. 2002, pp. 767-775.
International Search Report for PCT/GB2005/003594 dated Dec. 16, 2005.
International Search Report for PCT/GB2005/003680 mailed Dec. 1, 2005.
International Search Report mailed Jan. 14, 2005 in International Application No. PCT/GB2004/004169.
UK Search Report dated Dec. 4, 2003 in GB Application No. GB 0322859.0.
Gupta et al., "Capacity Bounding of Coherence Multiplexed Local Area Networks Due to Interferometric Noise," IEEE Proc.-Optoelectron., vol. 144, No. 2, pp. 69-74, Apr. 1997.
Szustakowski et al., Recent Development of Fiber Optic Sensors for Perimeter Security, Military University of Technology, IEEE 2001, pp. 142-148.
"Fading Rates In Coherent OTDR," Electronics Letters, vol. 20, No. 11, May 24, 1984.
U.S. Appl. No. 10/573,266, filed Mar. 23, 2006, Sikora et al.
U.S. Appl. No. 11/403,200, filed Apr. 13, 2006, Sikora et al.
U.S. Appl. No. 11/916,054, filed Nov. 30, 2007, Sikora et al.
U.S. Appl. No. 11/887,382, filed Sep. 28, 2007, Healey et al.
U.S. Appl. No. 11/918,434, filed Oct. 12, 2007, Healey et al.
U.S. Appl. No. 12/295,784, filed Oct. 2, 2008, Healey et al.
U.S. Appl. No. 12/280,051, filed Aug. 20, 2008, Healey.
U.S. Appl. No. 12/280,047, filed Aug. 20, 2008, Healey.
U.S. Appl. No. 12/280,038, filed Aug. 20, 2008, Healey.
Office Action dated May 14, 2009 in U.S. Appl. No. 11/916,054.
Office Action dated Jul. 8, 2009 in U.S. Appl. No. 11/791,927.
International Search Report mailed May 8, 2006 in PCT/GB2006/00750.
International Search Report mailed Jul. 27, 2006 in PCT/GB2006/001993.
International Search Report mailed Jun. 30, 2006, dated Jun. 7, 2006, in PCT/GB2006/001173.
International Search Report mailed Jul. 17, 2007 in PCT/GB2007/001188.
International Search Report mailed Apr. 13, 2007 in PCT/GB2007/000360.
International Search Report mailed Apr. 18, 2007 in PCT/GB2007/000343.
International Search Report mailed May 2, 2007 in PCT/GB2007/000359.
International Search Report mailed May 24, 2006 in PCT/GB2006/001325.

* cited by examiner

OPTICAL SYSTEM AND METHOD FOR INFERRING A DISTURBANCE

This application is the US national phase of international application PCT/GB2005/004873 filed 16 Dec. 2005 which designated the U.S. and claims benefit of GB 0427733.1, dated 17 Dec. 2004, the entire content of which is hereby incorporated by reference.

FIELD OF TECHNOLOGY

The present invention relates to an optical system, in particular an optical system in which a disturbance can be inferred.

BACKGROUND

Sensors are known which are able to detect a mechanical disturbance along one or more optical fibres in a cable or conduit, for example in order to detect a possible eavesdropping attempt or to otherwise provide for secure communication. However, the entire cable may be innocently disturbed, for example in the case of an underground cable, by a sound wave propagating through the ground.

It is known for sensors to operate using a form of interferometric principle based on speckle patterns. For this, a section of multimode fibre is splice-in at the locations to be sensed. As the light passes through the multimode section it excites a number of propagation modes which then interfere at the point where they are filtered by the transition back into the single-mode fibre. This mode-filtering of the speckle pattern is very sensitive to micro disturbance of the multimode fibre and results in a varying transmission loss through this section which is then detected. The problem with this approach is that it requires special fibres to be spliced in at all points to be sensitised and renders the fibre link unsuitable for standard transmission system use. It would be possible to make the entire link out of multimode fibre and filter the speckle pattern at the end, but this suffers from the same noise build up problem as the single mode case.

SUMMARY

According to the present invention, there is provided an optical system for sensing a disturbance, the system including: a first waveguide portion and a second waveguide portion disposed in a side to side arrangement relative to one another; launch means for launching a first signal and a second signal onto the first waveguide portion and the second waveguide portion respectively, the first and second waveguide portions being optically coupled such that each of the transmitted first and second signals travels along each of the first and second waveguides; and, combining means for combining the transmitted first and second signals so as to produce a combination signal, the first and second signals being related to one another such that a disturbance in the first or the second waveguide portions can be inferred from the combination signal.

One advantage of the present invention is that the noise or other signal resulting from a disturbance applied to both waveguide portions is likely to be at least partially suppressed relative to that resulting from a disturbance in just one of the first and second waveguide portions. Hence, if a disturbance is applied selectively to one of the waveguide portions, the disturbance can more easily be detected.

In a preferred embodiment, the first and second signals will be copies of one another. The copies need not be exact duplicates, and may have different amplitudes. Preferably, however, the signals will have common phase variations. The first and second signals may be generated by a continuous wave optical source, in which case successive ones of first and second signals may seamlessly follow on from one another. Alternatively, the optical source may be a pulsed source.

BRIEF DESCRIPTION OF DRAWINGS

Further aspects of the invention are provided in the appended claims. The present invention will now be described in further details below, by way of example, with reference to the following drawing in which:

DETAILED DESCRIPTION

Figure 1:
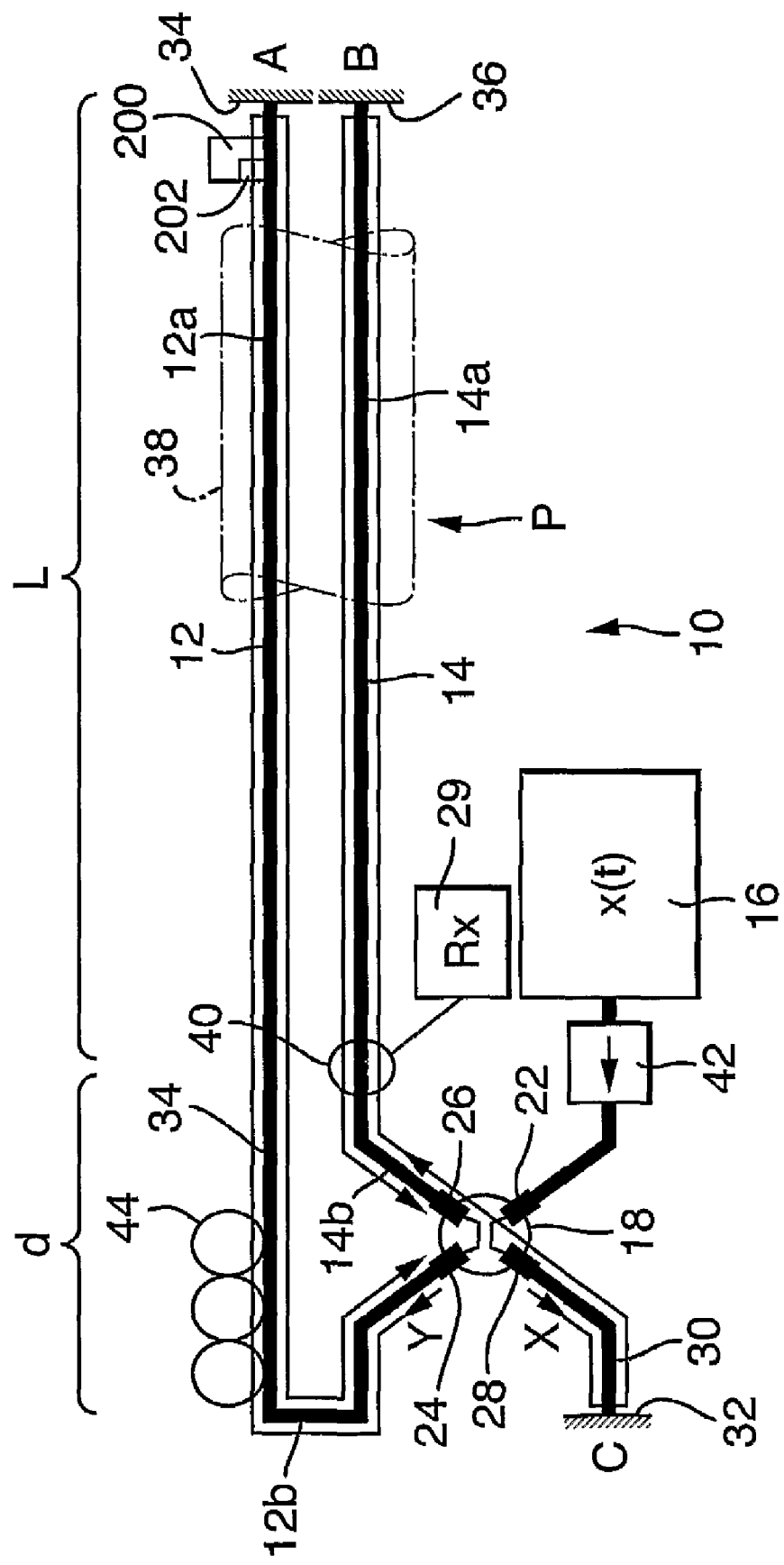
FIG. 1 shows an optical system according to the present invention.

As a general description, the operating principle of the differential-mode folded Mach-Zehender sensor is explained with reference to FIG. 1. The signal 'x(t)' from a broadband light source such as a super-luminescent diode or the amplified spontaneous emission (ASE) from an Erbium doped fibre amplifier (EDFA) is connected to the input port of a 2×2 fibre coupler via an optical isolator. The coherence time of the light source, tc satisfies the following inequality: tc<<d<<L, where 'd' is the differential delay between the two paths 'X' and 'Y' through the complete system, and 'L' is the one-way transmission fibre delay. (Typically, tc is of the order picoseconds, 'd' is of order nanoseconds, and 'L' is of order 100's microseconds.) The coupler splits the source signal into two parts (here assumed to be equal in amplitude), one part is routed over path 'X', the other over path 'Y'. Paths 'X' and 'Y' are shown in the diagram. Path X goes from the coupler to mirror C, back through the coupler and over the transmission leg to mirror B and back again. Path Y goes from the coupler through the polarisation controller/scrambler and transmission leg to mirror A and back again. There are numerous paths through the system that are not shown in the diagram as these do not contribute to the operation of the sensor as described here. The two waves travelling on the outward journey of fibre paths X and Y, along the transmission leg 'L' towards mirrors A and B respectively, are separated in time by a small differential delay approximately equal to 'd' (a few nanoseconds). Thus, for all practicable purposes the two waves will see essentially the same disturbance signal if the two transmission fibres are in close proximity. This is because the disturbance is likely to have frequency components in the audio range-corresponding to time scales measured in milliseconds. The same conditions also apply for the two waves on their return journey after being reflected from mirrors A and B. On returning to the 2×2 coupler, the two waves are split into two parts again. This time we are only interested in the light from path X that is coupled onto path Y, and the light from path Y that is coupled onto path X (in the reverse direction). Clearly, half of the light that was on path X now travels over path Y and visa-versa. The time difference between the two propagating waves in the transmission section is still approximately 'd', so both see essentially the same disturbance for a second time, albeit at a time epoch approximately 2 L seconds later. This time, when the waves return to the coupler they have traveled exactly the same total path delay of X+Y and so are phase coherent and will mix interferometrically. Thus, any disturbance causing a differential phase shift between the two waves will cause the light transmitted by the coupler to vary in amplitude at the two output ports. This amplitude modulation is monitored in order to determine the nature of the disturbance. Clearly the monitoring receiver could be placed on either leg and at any position along that the chosen leg, however the signal will be strongest closer to the coupler due to fibre losses.

In more detail, FIG. 1 shows an optical system 10 in which a disturbance along either one of a first optical fibre 12 or a second optical fibre 14 can be sensed (the fibres 12, 14 are indicated by a thick line). The first and second fibres 12,14 are respectively connected to the first and second ports 24, 26 of a four port (2×2) coupler 18. A broadband light source 16 is coupled to the third port 22 of the coupler 18, whilst a stub or other short portion of fibre 30 is connected to the fourth port 28. For each fibre 12,14,30, there is provided at an end remote to the coupler 18 a respective reflector 34,36,32 for returning signals towards the coupler 18.

The coupler 18 is arranged such that light input at either of the first or fourth port is output at both the second and third port. Likewise, light incident at the second or third port is output to both of the first and fourth ports. In this way, for each optical signal incident on a port, a pair of copies is effectively formed at the coupler 18. In this example, the coupler is a 50:50 coupler which couples light to the same extent to each of the second and third ports (or each of the first and fourth ports), although a coupler with a different coupling ratio could be used.

Each of the first and second fibres 12, 14 includes a respective transmission portion or "leg" 12a, 14a, and a connecting portion 12b,14b, the transmission portions 12b,14b of the fibres being retained relative to one another by a retaining member, for example a common channel such as a common sleeve 38. The connecting portions are not of equal length, resulting in a temporal offset between signal copies of a pair travelling along the transmission legs 12a,14a. In FIG. 1, the connecting portion of the first fibre is the longest, thereby forming a delay line 12b located between the coupler 18 and the transmission portion 12a. Thus, the delay line 12b imposes a delay on optical signals travelling in the transmission portion of the first fibre, relative to the optical signals travelling in the transmission portion of the second optical fibre.

To understand the operation of the system 10, it is helpful to consider the paths of optical signals transmitted by the source 16. These signals, upon arriving at the coupler 18, are split into two parts, the different parts being copies of one another (although in this example the coupler splits the signal into copies having equal amplitude, the amplitude of the copies need not be the same). One copy is routed over path "X", the other copy being routed over path "Y" (paths X and Y are shown in FIG. 1 by narrow lines).

Light travelling along path X exits the coupler that the fourth port 28, travels along the stub portion 30, before being reflected at reflector 32 and returning along the same fibre to the coupler at the fourth port. The light travelling along path X then exits the coupler at the second port 26, and travels along the second fibre 14, in particular over the transmission portion 14a, before being returned towards the coupler by the reflector 36 at the end of the second fibre. Light travelling along path Y exits the coupler at the first port 24, travelling along the first fibre 12 in the forward and reverse directions, being reflected at the end of the second fibre by the reflector 34.

If a dynamic disturbance is applied to the first and second fibre transmission portions 12a,14a at point P, where the fibres are in the sleeve 38, the disturbance is likely to have a similar effect on the transmission properties of both fibres. This is because both fibres are in close proximity to one another with the result that a disturbance applied to the sleeve will result in almost the same movement to each of the fibres. The phase change imposed on signals travelling in the fibres is thus likely to be the same for both fibres.

The differential delay or equivalently the temporal offset for signal copies of a pair travelling on the two transmission legs 12a,14a is chosen so as to be small compared to the timescales on which a disturbance is expected to occur: physical disturbances are likely to be due to acoustic vibrations, and will therefore occur on timescales the order of milliseconds, whereas the differential delay will be of the order of nanoseconds. Thus, signal copies produced at the coupler 18 will experience on their outbound journey (i.e., towards reflectors 34, 36) essentially the same phase change in response to the dynamic physical disturbance at point P. Likewise, signals along the first and second fibres are likely to experience the same disturbance on their return journey towards the coupler 18.

On returning to the coupler 18, the signal at each of the first and second ports gives rise to two further copies. To understand the operation of the system, it is helpful to consider light from path X that is coupled onto path Y, and the light from path Y that is coupled onto path X, this time travelling along paths X and Y in the reverse direction. In the case of a 50:50 coupler, approximately half of the light previously on path X now travels over path Y, and visa-versa. Again, the relative time delay between the signal copies in each fibre is small in comparison to the timescale of a disturbance, such that again, both signals experience the same phase change in response to the disturbance at P. Thus when the signals return to the coupler for the second time, each signal has traveled the same total path (each along path X and path Y). Furthermore, each signal has experience the same cumulative phase change due to the disturbance experienced each time each signal passes the point P. Therefore the signals returning from paths X and Y for the second time are phase coherent and will mix interferometrically: that is, both signals will be in phases, and will interfere constructively at the coupler 18. This is because on each of the outbound and inbound journeys, the disturbance experienced by the signals will be the same for both the first and second fibres (notwithstanding that the displacement of the fibres due to dynamic disturbance will be different for signals travelling in the outbound and in bound directions).

If however only one of the first and second fibres 12, 14 is disturbed, whilst the other of the first and second fibres is left undisturbed, light travelling on only one of the paths X and Y will undergo a phase disturbance, and therefore the signal output from the coupler 18 will be changed. This changed signal can be monitored at a tap 40 placed in the first fibre, although the tap could instead be located in the second fibre. Although the tap could be placed at different positions along the first fibre, the signal will be strongest close to the coupler due to fibre losses.

Figure 3:
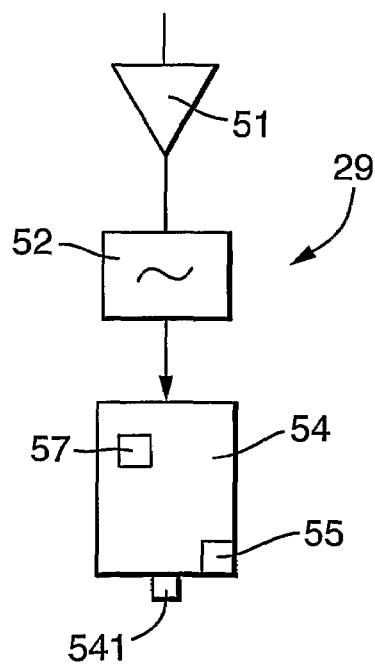
FIG. 3 shows components of a signal processing system for use in the systems of FIGS. 1 and 2.

An optical isolator 42 is located between the source and the coupler 18, to reduce the likelihood of instabilities occurring in the source due to light travelling from the coupler back towards the source. The source will preferably be a broadband light source such as a super-luminescent diode or otherwise, the signals may result from the amplified spontaneous emission from an Erbium doped fibre amplifier. To reduce the undesirable effects of polarisation rotation in the fibres, a polarisation controller/scrambler 44 is located in the second fibre, between the coupler 18 and the sensing portion 14a of the second fibre The tap 40 will be connected to a signal processing system 29 as shown in FIG. 3. The signal processing system includes: a photo-receiver 51 coupled to the first coupling stage 28 for converting optical signals into electrical signals; a filter 52 for receiving electrical signals from the photo-receiver 51 and filtering the electrical signals; and, a signal processing unit 54 for processing the filtered electrical signals. In one simple embodiment, the signal processing unit will be an amplifier, such as audio amplifier. Alternatively, the signal processing unit may be a digital system as outlined below.

The filter 52 is matched to the expected signal bandwidth in order to minimise extraneous noise. It may typically have a bandwidth of about 100 kHz (although a different bandwidth is possible). The signal processing unit 54 is configured to perform a spectrum analysis of the (filtered) interference signal from the coupling stage 28, for example by performing Fourier Transform on the interference signal, to transform the time dependent interference (combination) signal into a spectrum which has the frequency components forming that time dependent signal. The measured spectrum is then compared with known spectra or signatures resulting from known disturbances in a fibre. Such known signature spectrum (or at least the characteristic frequency components of such signature spectra) will be stored in a memory location 55 of the signal processing unit 54.

To compare a measured spectrum with a known signature spectrum, the following steps may be performed by a processor 57 of the signal processing unit 54: (a) determine which, if any, frequency components are above a threshold value, and (b) determine if these frequency components coincide (within a tolerance level) with the characteristic frequency components of known signature spectra. Thus, for each measured spectrum, a respective comparison step will be performed with each of the stored signature spectrum. If only the characteristic component of a signature spectrum are stored in the memory location 55, the information stored for each signature spectrum may simply include a list of characteristic frequencies for that spectrum. The processor 57 can then compare the respective frequency values of each component of a measured spectrum with the frequency values of a signature spectrum. A score value indicative of the degree of correlation between a measured spectrum and a signature may then be generated, and an alarm may be triggered if the score value exceeds a threshold.

To determine the degree of correlation, the following steps may be performed; (a) for a frequency component of a measured spectrum, determine whether a signature spectrum has a frequency component within a tolerance level of the measured frequency component, incrementing a score value counter if a match is found; (b) for each frequency component in the measured spectrum above a threshold, repeat step (a) with respect to that signature spectrum, incrementing the score value counter each time a match is found; and, (c), associating a score value with the final value of the score value counter, for each measured spectrum in respect of at least one signature spectrum.

The memory location 55 may also store an amplitude value associated with each frequency component of a signature spectrum. The processor 57 may then perform a more sophisticated algorithm, in which when determining the degree of correlation between a frequency spectrum and a measured spectrum, the similarity of the frequency values as well as the amplitude of the corresponding components is taken into account when incrementing the score value counter. The memory location 55 will preferably be configured to store interference signals received within a time interval, the comparison between a measured spectrum and signature spectra being performed in respect of each captured or measured spectrum in each time interval. If a disturbance is detected, a disturbance signal can be produced at output 541.

Figure 2:
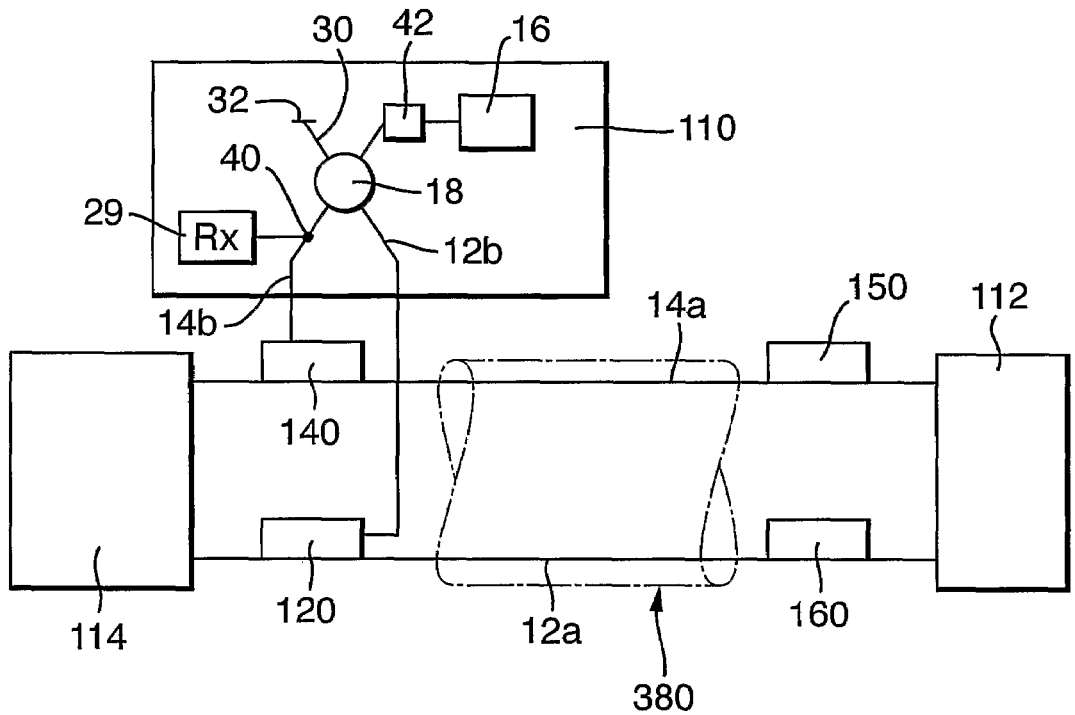
FIG. 2 shows a further optical system.

The connecting portions of fibre 12b,14b of FIG. 1 may be connected to an existing fibre cable having a plurality of transmission fibres as indicated in FIG. 2 (like components having like numerals). In FIG. 2, monitoring apparatus 110 is connected to respective fibres 12a, 14a of a fibre cable link 380 via respective wavelength division couplers 120, 140. Sensing signals from the source 16 at a first wavelength are split into copies at the coupler 18, which copies are launched onto respective fibres 12a, 14a by respective wavelength division multiplex couplers 120, 140. After travelling to the ends of the fibres, the sensing signals are returned towards the monitoring apparatus by respective reflectors at each end of the fibres. Upon returning to the wavelength division multiplex couplers 120, 140, the sensing signals are extracted from the respective fibres 12, 14. Thus, the sensing signals will follow paths corresponding to paths X and Y of FIG. 1, so that the sensing signals can be used to determine if a disturbance is caused in one but not both of the sensed fibres 12, 14. Traffic signals can propagate through the fibres 12a, 14a between first and second terminals 112,114 in the normal way at a second wavelength, different from the first wavelength. At a remote point, beyond the portion of the link 380 that is being monitored, there are provided downstream wavelengths division multiplex couplers 150, 160, for each respective fibre, the couplers being arranged to act as reflectors for returning light at the sensing wavelength towards the monitoring apparatus.

An eavesdropper attempting to tap into one of the fibres to intercept data is unlikely to be able to move each of the fibres in precisely the same way, with the result that a change in the sensing signal will be detected. Conversely, when the cable 380 as a whole is disturbed, for example because of vibrations in the ground in the case where the cable is an underground cable, the response of the optical monitoring apparatus will be suppressed or at least reduced, thereby reducing the risk of a false alarm.

The optical system can be used to communicate data securely. At a remote monitoring station 200, data is modulated onto the second fibre 14 (data could alternatively be modulated onto the first fibre). The data will preferably be modulated using a phase modulator 202. Because signals along only one of the fibres are modulated, these phase modulations will be detected at the receiver in a similar fashion to the detection of a disturbance. In each of the above examples, the fibres 12 and 13 will preferably be single mode fibres.

As it will be appreciated from the above embodiments, pairs of optical fibres/cables are employed in a differential, common-mode rejection, disturbance sensor. When the two fibres are physically close together they will 'see' essentially the same disturbing signal. However, where they are separated or individually disturbed, for example by someone trying to tap into the fibre, they will see different signals. The system acts as a folded interferometer, and is designed so that when both fibres 'see' the same disturbance its output is minimised. This common-mode rejection property reduces the effect of background noise, but gives high sensitivity when one fibre is disturbed differently from the other. The common mode operation could be over two fibres in the same fibre bundle, or in the same conduit, cable, sub-duct, or duct in order to provide the required degree of discrimination. Alternatively, the two fibres could be separated in joint housings, footway boxes, etc, in order to sensitise these specific locations. However, the fibre remains sensitive along its length to anyone trying to tap into it.

The theoretical operation of the differential-mode folded Mach-Zehender sensor is now outlined on the following series of diagrams . . .

The source coherence time $\tau_c$ satisfies the following inequality . . .

$$\tau_c \ll d \ll L$$

Thus, ignoring higher order reflection terms, which are relatively low in magnitude due to the accumulated transmission losses, the dominant coherent terms at the input to the coupler are given by the shaded area. On the receiver leg these become . . .

$$\vec{\alpha}_{coh} \sim R_A.R_B.R_C.x\{t-2d-4L\}.\exp\{-(2d+4L).k\}.\exp\{-j\pi/2\}/4 =$$
$$S.x\{t-2d-4L\}.\exp\{-j\pi/2\}$$

$$\vec{\beta}_{coh} \sim R_A.R_B.R_C.x\{t-2d-4L\}\exp\{-(2d+4L).k\}.\exp\{-j3\pi/2\}/4 =$$
$$S.x\{t-2d-4L\}.\exp\{-j3\pi/2\}$$

where 'S' is a scalar representing the total loss; $S=R_A.R_B.R_C.\exp\{-(2d+4L).k\}/4$ The resulting intensity, I(t) is given by $$\left|\vec{\alpha}_{coh} + \vec{\beta}_{coh}\right|^2,$$

which becomes . . .

$$I(t) = |\alpha_{coh}|^2 + |\beta_{coh}|^2 + S^2.|x\{t-2d-4L\}|^2.\exp\{-j\pi\} + CC$$
$$= 2.S^2|x\{t\}|^2.[1+\cos\{\pi\}] =$$
0(for the special case of no disturbance signals).

We have also assumed that the source x(t) is a stationary random process.

However, when we introduce a disturbance the output depends on the differential pick-up on legs A and B.

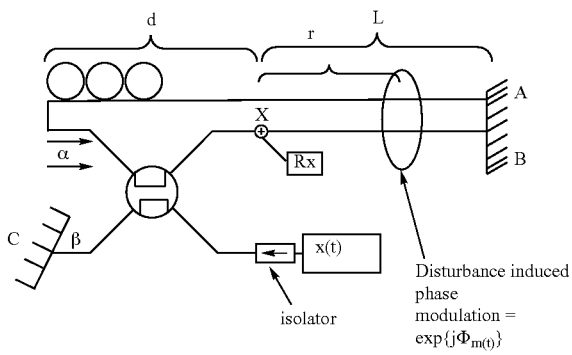

After some tedious algebra it can be shown that . . .

$$\vec{\alpha}_{coh} \sim S.x\{t-2d-4L\}.\exp\{-j\pi/2\}.\exp\{j[\phi_{m''(t-2(L+d))} + \phi_{m'(t-d)}]\}$$

$$\vec{\beta}_{coh} \sim S.x\{t-2d-4L\}.\exp\{-j3\pi/2\}.\exp\{[\phi_{m'(t-2(L+d))} + \phi_{m''(t-d)}]\}$$

where, m'(t)=$m_A$(t-r).$m_A$(t-2L+r) and m''(t)=$m_B$(t-r).$m_B$(t-2L+r) are the signals induced on legs A & B respectively The resulting intensity, I(t) is . . .

$$I(t)=2.S^2|x\{t\}|^2.[1+\cos\{\phi_{m''(t-2(L+d))} + \phi_{m'(t-d)} - \phi_{m'(t-2(L+d))} - \phi_{m''(t-d)} + \pi\}]$$

Now, if m'(t)=m''(t) due to close coupling the phase terms cancel resulting in I(t)=0, however, if m'(t)≠m''(t) due to fibre separation or disturbing just one leg, an output signal results.

The incoherent terms produced by the interferometer give rise to low-level background spontaneous-spontaneous beat noise which can be minimised by reducing the source coherence time. The higher order reflected signals that travel over paths X+Y multiple times are significantly reduced in magnitude due the losses in the fibre transmission path and the interferometer.

The polarisation controller is used to align the state of polarisation of the waves that have traversed paths X+Y at the input to the coupler and produce a phase bias in order to optimise the coherent mixing process. Alternatively, with a small penalty on the system sensitivity, the polarisation controller could be replaced by a polarisation scrambler, such as a fibre Lyot de-polariser, in order to eliminate the need for any adjustable parts.

The mirrors at the end of the transmission link L could be simple end reflections from un-terminated fibre connectors. Either, or both, transmission legs to mirrors A and B could be dedicated fibres or virtual channels wavelength division multiplexed over data services used well known WDM techniques.

The invention claimed is:

1. An optical sensing system for sensing a disturbance in one of a first waveguide portion and a second waveguide portion relative to a disturbance in the other of the first waveguide portion and the second waveguide portion, the optical system having: means for generating a first signal and a second signal; means for directing the first signal along a first path and for directing the second signal along a second path and for directing the first and second signals to traverse the first and the second waveguide portions in both a first direction and a second direction opposite the first direction; and, combining means for combining the first and second signals that have travelled along the first and second paths so as to provide a combination signal, the first and second signals being related to one another such that the disturbance can be inferred from the combination signal.

2. The optical system as claimed in claim 1, wherein the first and second signals each have an irregular component, the first and second signals being related such that the irregular component is common to the first and second signal.

3. The optical system as claimed in claim 2, wherein the first and second signals each have a waveform, the irregular component being an irregular phase of the respective waveforms.

4. The optical system as claimed in claim 1, wherein the first and second signals are copies of one another.

5. The optical system as claimed in claim 1, wherein there is provided a delay stage arranged to impose a relative time delay between the first and second signals.

6. The optical system as claimed in claim 5, wherein the first and second signals have a phase coherence time associated therewith, and wherein the relative time delay is greater than the phase coherence time of the signals.

7. The optical system as claimed in claim 6, wherein the relative time delay is greater than the phase coherence time of the signals by at least a factor of five.

8. The optical system as claimed in claim 7, wherein the relative time delay is greater than the phase coherence time of the signals by at least a factor of ten.

9. The optical system as claimed claim 5, wherein the delay is imposed at least in part by a further waveguide portion integrally formed with the first waveguide portion or the second waveguide portion.

10. The optical system as claimed in claim 9, wherein the first and second waveguide portions are each formed from respective portions of optical fibre.

11. The optical system as claimed in claim 10, wherein a common channel is provided along which the waveguides extend.

12. The optical system as claimed in claim 11, wherein the channel is formed by a common sleeve.

13. The optical system as claimed in claim 12, wherein the channel is formed by a common conduit.

14. The optical system as claimed in claim 1, wherein the directional means include a reflector arrangement, the first and second waveguides each extending between the reflector arrangement and the coupler arrangement.

15. The optical system as claimed in claim 1, wherein the directional means and the combining means include in common a coupler arrangement.

16. The optical system as claimed in claim 15, wherein the common coupler arrangement is arranged in use for coupling an input signal from an optical source to the first and second waveguides, the first and second signals being formed from the input signal.

17. The method of determining whether a first waveguide is disturbed relative to a second waveguide, the method including the steps of: generating pairs of signals, each pair including a first signal and a second signal; channelling the first signals along a first path; channelling the second signals along a second path such that each path traverses each of the first and the second waveguide portions in both a first direction and a second direction opposite the first direction; and combining the first and second signals of each pair that have travelled along the first and second paths so as to provide a combination signal, the first and second signals being related to one another such that the disturbance can be inferred from the combination signal.

18. The method as claimed in claim 17, wherein the disturbance is an acoustic disturbance.

* * * * *